(12) United States Patent
Cox (10) Patent No.: US 11,127,280 B2
(45) Date of Patent: Sep. 21, 2021

(54) EMERGENCY IDENTIFICATION SYSTEM

(71) Applicant: FIV (Fast Identification Vests), L.L.C., Vernal, UT (US)

(72) Inventor: Andrew Cox, Vernal, UT (US)

(73) Assignee: FIV (Fast Identification Vests), L.L.C., Vernal, UT (US)

(*) Notice: Subject to any disclaimer, the term of this patent is extended or adjusted under 35 U.S.C. 154(b) by 8 days.

(21) Appl. No.: 16/508,120

(22) Filed: Jul. 10, 2019

(65) Prior Publication Data
US 2020/0105121 A1 Apr. 2, 2020

Related U.S. Application Data

(60) Provisional application No. 62/739,223, filed on Sep. 29, 2018.

(51) Int. Cl.
| | |
|---|---|
| G08B 23/00 | (2006.01) |
| G08B 25/01 | (2006.01) |
| G08B 7/06 | (2006.01) |
| G07C 9/00 | (2020.01) |
| H04W 4/90 | (2018.01) |
| H04M 1/72424 | (2021.01) |

(52) U.S. Cl.
CPC ....... *G08B 25/016* (2013.01); *G07C 9/00182* (2013.01); *G08B 7/06* (2013.01); *H04M 1/72424* (2021.01); *H04W 4/90* (2018.02); *G07C 2009/00269* (2013.01)

(58) Field of Classification Search
CPC ........ G08B 25/016; G08B 7/06; G08B 5/004; G08B 21/02; G08B 25/10; H04M 1/72541; H04M 1/72424; G07C 9/00182; G07C 2009/00269; G07C 9/20; G07C 9/28; H04W 4/90; A45C 9/00; A45C 7/0086; A45C 3/004; A45C 2009/007; A45C 7/0095; F41H 5/0457; F41H 5/08; F41H 1/02; A41D 15/04; A41D 13/0518; G09F 3/207; G09F 3/18; G06K 19/07758; G06K 7/10009; A44C 3/001; A45F 5/00; A45F 2005/006; A45F 2200/055; A45F 2003/002

USPC ........... 340/568.7, 573.1, 456, 462; 224/577, 224/576, 681, 600, 605; 2/456, 462

See application file for complete search history.

(56) References Cited

U.S. PATENT DOCUMENTS

| | | | |
|---|---|---|---|
| 3,837,007 A | * | 9/1974 | Girest .................... A41D 27/10 359/519 |
| 5,588,154 A | | 12/1996 | Blauer et al. |
| 5,829,653 A | | 11/1998 | Kaiser |

(Continued)

FOREIGN PATENT DOCUMENTS

WO    WO 2015/145121    10/2015

*Primary Examiner* — Anh V La
(74) *Attorney, Agent, or Firm* — Bateman IP (57) ABSTRACT

An emergency identification system includes a plurality of identification holders which hold vests which are made to be deployed during an emergency in order to identify designated authority figures who may lead or provide instructions during the emergency. The vests may be color-coded so as to readily identify the designated authority figures and the vests may be stored in such a manner that the vests are inaccessible to potential bad actors so as to prevent them from imitating the vests during an active shooter or other terrorist event.

21 Claims, 8 Drawing Sheets
(2 of 8 Drawing Sheet(s) Filed in Color)

(56) References Cited

U.S. PATENT DOCUMENTS

| | | | |
|---|---|---|---|
| 5,977,876 A * | 11/1999 | Coleman | A45C 13/10 340/539.1 |
| 8,356,737 B2 | 1/2013 | Lessman | |
| 2003/0011466 A1* | 1/2003 | Samuel | G07F 9/06 340/5.73 |
| 2007/0232164 A1 | 10/2007 | Swan et al. | |
| 2007/0295772 A1 | 12/2007 | Woodmansee | |
| 2010/0127024 A1* | 5/2010 | Cortes | A45F 4/02 224/153 |

* cited by examiner

EMERGENCY IDENTIFICATION SYSTEM

BACKGROUND

State of the Art

The present invention relates to an identification system for teachers and the like in the event of an emergency. In particular, the present invention relates to a system for readily identifying teachers and other authorized personnel in active shooter and other emergencies.

Field of Art

Active shooter situations and other school emergencies have become a cause of major concern in the United States. Individuals' intent on doing harm know that they can inflict substantial damage by infiltrating a school or other building having a large number of people in a confined space. Even a few weapons, explosives or deadly chemical agents can inflict a maximum amount of damage in a very short period of time. If the bad actor knows the layout of the building, he or she will often be able to isolate a substantial number of people who can then be killed, injured or taken hostage depending on the goals of the perpetrator.

Active shooter and other terroristic scenarios raise several unique concerns. In some situations the perpetrator does not wish to escape and is willing to die to carry out an attack on the school, etc. This presents unique problems because the perpetrator may be willing to try and blend in with the students or other occupants of the building while luring them to a location where they are at greater risk. In some terrorist attacks, terrorists have led children into gymnasiums, etc., in order to maximize the number of hostages or victims. In a time of panic, many children are likely to follow any adult giving instructions and may actually be placed in greater danger.

In other instances, the shooter or other perpetrator has escaped the scene by removing clothing items so that he or she will fit into the crowd. For example, in one recent scenario an active shooter wore a black coat into a school over a school jersey. After shooting several students, the shooter hid the gun, removed the jacket and walked out of the school with the other students right past police officers. It was only hours later that the student was apprehended.

Active shooter and other terrorist situations also are problematic as police officers do not know who belongs and who does not. Of particular concern are adults which are present. In some terrorist attacks, the perpetrators were adults. Some of the adults seen by the police, however, were teachers, administrators and/or maintenance staff at the school. In an emergency situation, it is difficult for police officers to readily determine who is properly present and who may be a perpetrator. There is always a concern that officers will inadvertently shoot one of the teachers or other staff, particularly if the teacher is wrestling what appears to be a student, as may occur if the teacher is trying to get the gun away from the shooter.

Many shooters attack schools because of the high probability that there will be few or no armed personnel present. Even in cases where an armed police officer was at the school, the officer may be a substantial distance from the active shooting, and in some cases the officers have elected to simply not confront the shooter. Because of these concerns, many schools have decided to allow certain trained teachers who are concealed carry permit holders to carry their firearms in school. Such a scenario allows a teacher to intervene in an active shooter or terrorist situation long before the police arrive. One of the major concerns for concealed carry holders, however, is that they may inadvertently be shot by police who mistakenly believe that they are one of the perpetrators. For example, if an armed teacher (administrator or other staff) has been able to place an active shooter in a surrender position, a police officer turning the corner may inaccurately believe that the adult is the perpetrator and holding a student at gun point. This creates a very dangerous scenario for both the officer and the teacher.

Another major concern in active shooter situations and many other emergencies is that students do not know whom they can follow to safety or what adults they can trust. While in many small rural schools students will know most if not all of the teachers, in a large urban or suburban high school it is common that any given student may know less than half of the faculty and staff. If an emergency occurs and the student sees an adult he or she does not know directing the students, the student may be unwilling to follow directions not knowing if the adult is a teacher or a potential bad actor.

To increase the likelihood that students will follow the direction of teachers or other authorized personnel, suggestions have been made for the authorized personnel to have vests or other indicia of authority which can be readily identified by students. While vests, etc., are advantageous, many teachers are unlikely to wear the vest at all times. Rather, the vest may typically be placed on a coat rack or the back of the door. In such a position, however, the vest is not useful if the teacher is out of the room during an emergency. Additionally, there is a risk that the vest will be stolen and then used by a bad actor to give a false appearance of authority, thereby deceiving students and the police alike. Alternatively, the bad actor may simply look at what kind of vest is being used at a particular facility and then obtain a similar vest for use during a terroristic act.

Thus, there is a need for an emergency identification system by which authority figures or other designated adults can be identified during an active shooter or other emergency situation. It is preferred that such a system be relatively easy to use and economical.

SUMMARY OF THE INVENTION

The following summary of the present invention is not intended to describe each illustrated embodiment or every possible implementation of the invention, but rather to give illustrative examples of application of principles of the invention.

In some configurations, the invention may comprise of an identification holder which includes a removable vest or sash (collectively referred to herein as a vest) to be worn by the designated authority figure. The identification holder may be configured to hold the vest so that the color scheme thereof cannot be observed without physically altering the identification holder.

In some configurations, the identification holder may be sewn shut, glued or otherwise attached so that a seam must be ripped, etc. in order to access the vest inside, thereby indicating whether the identification holder has been tampered with. Alternatively, some other destructible seal could also be used for the same purpose.

In some configurations, the identification holder may include a chip which is either read or which transmits so as to indicate when the identification holder has been opened in a manner to deploy the emergency vest. Such a chip, may include, for example, an RFID chip, or a micro transmitter. In some configurations a school or other building may be provided with receivers or detectors which use the chip to sense whether one or more identification holders have been opened to access the vests to thereby provide an early indication that an emergency situation may be present.

In some configurations, the vests may be color-coded but retained within the identification holders so that the colors are not visible. Thus, when the vests are deployed students or others can readily identify designated authority figures with minimal risk that a bad actor has a vest or other indicator consistent with those of the designated authority figures.

In some configurations, the vests may be color-coded so as to differentiate between various designated authority figures having different rights or responsibilities. (By authority figures it is meant people who one would look to for instructions in an emergency situation). For example, most teachers, administrators, or staff may have vests of one color or configuration, while those who are authorized to be carrying a firearm may have a different configuration or color on their vest so as to make clear to police and others those individuals who are likely to be armed, etc.

DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the present disclosure are shown and described in reference to the numbered drawings wherein.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "embodiment," "configuration," or plural versions thereof means that a particular feature, structure, or characteristic described in connection with the embodiment may be included in at least one embodiment, etc., but does not require said feature structure or characteristic to be present unless identified in the claims.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "a bracket" may include an embodiment having one or more of such brackets, and reference to "the target plate" may include reference to one or more of such target plates.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without being exactly that quality. For example, a structure said to be generally vertical would be more vertical than horizontal, i.e. would extend more than 45 degrees from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Figure 1:
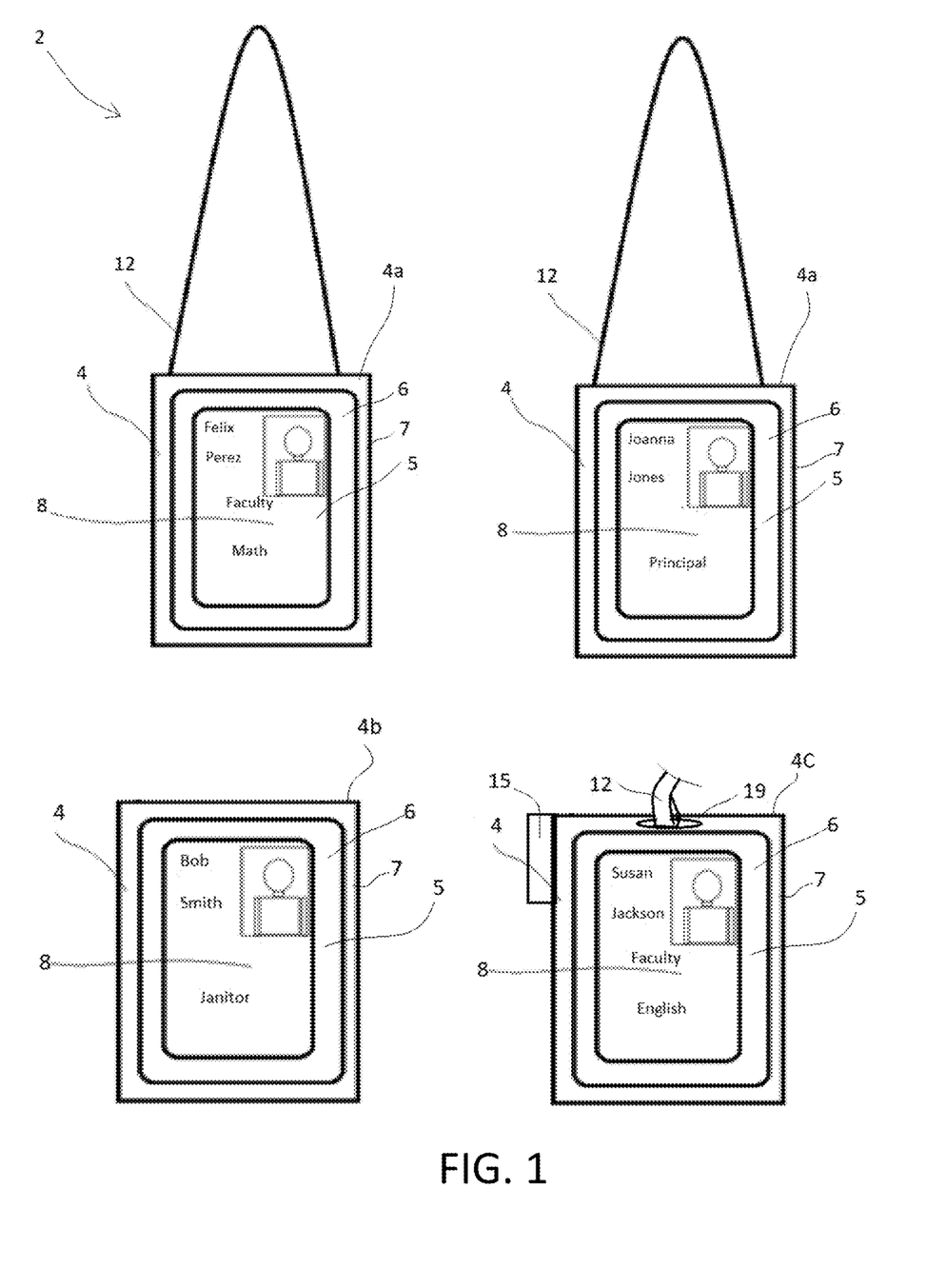
FIG. 1 illustrates a number of identification holders formed in accordance with aspects of the present invention.

Turning now to FIG. 1, there is shown an emergency identification system, generally indicated at 2. While the emergency identification system 2 is discussed herein in the context of use in a school, it will be appreciated that the emergency identification system can be used in any buildings or other locations which are susceptible to emergency situations, and particularly to active shooter or terrorist events.

The emergency identification system 2 may include at least one identification holder 4 which includes a pocket 5 with a see-through side or other retainer used to hold an identification card 8, such as a teacher/administration/staff identification card. This may, for example, include a sheet of clear vinyl 6 surrounded by an edge binding 7.

Figure 2:
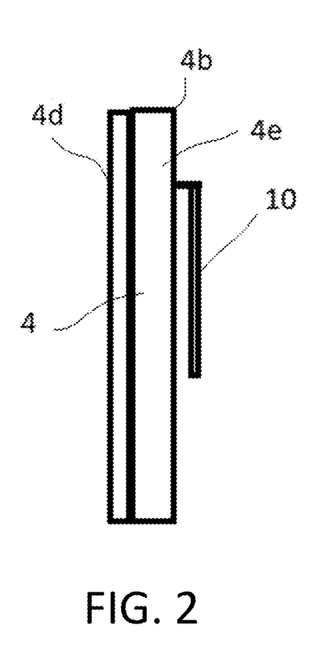
FIG. 2 illustrates a side view of one of the identification holders of FIG. 1 configured to be attached to a belt.

While identification holders 4 often include a string or lanyard 12, such as shown on identification holders 4a (permanent) and 4c (removable), it could also be made similar to a wallet, or include a clip 10 for attachment to a belt, waistline of pants or a skirt, etc., as shown in FIG. 2. The identification holders can be made to appear similar to conventionally available identification holders so that third parties are unaware that they hold a vest for use in an emergency. The identification holders 4 may also include an elastic loop 15 for holding pencils, pens, or the like and may include a grommet 19 for a removable lanyard as shown on holder 4c.

Figure 3:
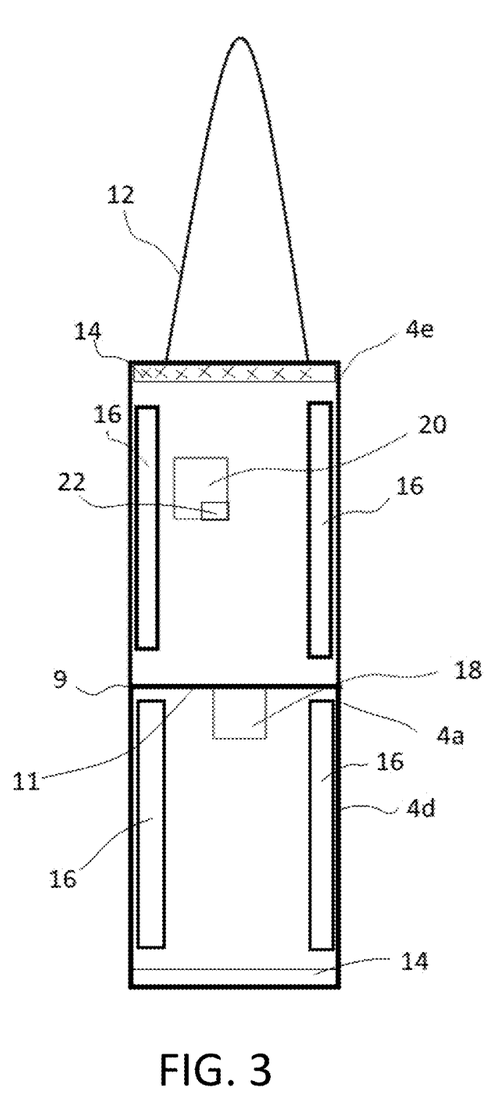
FIG. 3 illustrates an identification holder of FIG. 1 which has been opened in an emergency situation.

The identification holder 4 is designed so that a portion will open when pulled in an emergency to expose a second/inner pocket 11 holding a vest as shown, for example, in FIG. 3. For example, in FIG. 3 a front portion 4d of the identification holder 4 may be attached along the bottom 9 of a rear portion 4e (or formed integrally with the rear portion), and releasably attached along the top 10 by a rippable/tearable seam 14. The seam 14 may be sewn, glued, or otherwise attached so that it is apparent once the seam has been compromised.

Inside the identification holder 4 is a tab 18 of an emergency vest. While the teacher identification holder may be held together with Velcro strips 16, it is preferred that the front and back portions 4c and 4e be stitched or otherwise held together (e.g. glued) so that a person cannot access the vest associated with the tab 18 without it being apparent that the vest has been accessed. The reason for this aspect of the invention is that it may be desirable that no one knows the colors of the vest until deployment in an actual emergency. This prevents an active shooter/terrorist, etc. from learning the color scheme for the school and misusing it to gain students trust when committing their crimes. During an emergency, the teachers, etc. will deploy their vests and it will be readily apparent by the consistent color scheme that each of the authority figures is a trusted source for providing directions, etc.

Figure 4:
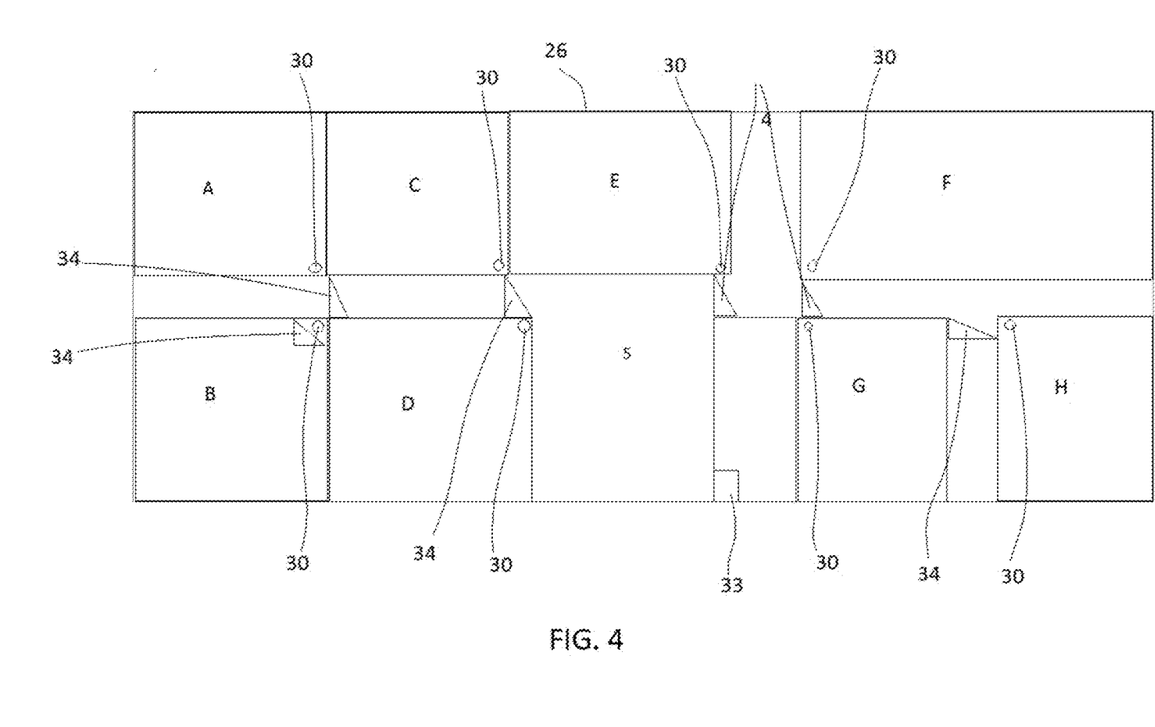
FIG. 4 shows a plan view of the school having sensors therein in accordance with one aspect of the present invention.

In addition to or in place of a tearable or rippable seam 18, the identification holder 4 may include a chip 20 which activates when the identification holder has been opened, thereby providing a signal that an emergency is in progress. This can be done by the chip 20 including a transmitter or transceiver 22 which sends a signal indicating an emergency situation, or by functioning as a scannable chip which is detectable once the identification holder 4 has been opened, such as an RFID chip. It will be appreciated that a school 26 may be wired with sensors 30 (FIG. 4). Upon detecting the opening of the identification holder 4, the system may be used by administration to contain any emergency situations. Thus, for example, if two teaches in zone A activate their sensors by opening their identification holder, a control system 33 may be activated. The control system 33 could close doors 34 to isolate zone A from the remainder of the school to thereby prevent an active shooter, etc. from advancing through the school. The doors 34 could also be programmable so that they would allow for evacuation of the building but not for entry into the building of someone lacking an authorization code, etc. Thus, the school could be programmed to go into lockdown mode well before anyone in the school office even is aware that there is an emergency. The location of the emergency can also be relayed to responding police officers so they know exactly where to approach the school to best respond to the emergency.

While the use of a passive chip 20 which is read by the sensors 30 may not need to be powered, an active chip, such as a chip having a transceiver or transmitter could include a battery which is insulated from the chip until the front portion 4d and rear portion 4e are pulled apart. As soon as the insulators are removed, the chip 20 could broadcast a signal indicating an emergency. This would also be beneficial in the event that someone attempts to tamper with the identification holders 4 to access one of the vests.

Figure 3A:
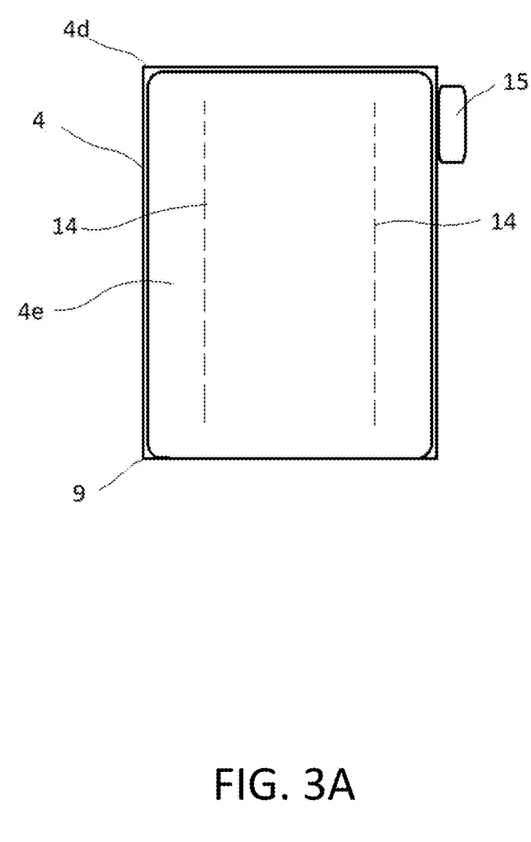
FIGS. 3A and 3B show an alternate configuration of an identification holder of FIG. 1.
Figure 3B:
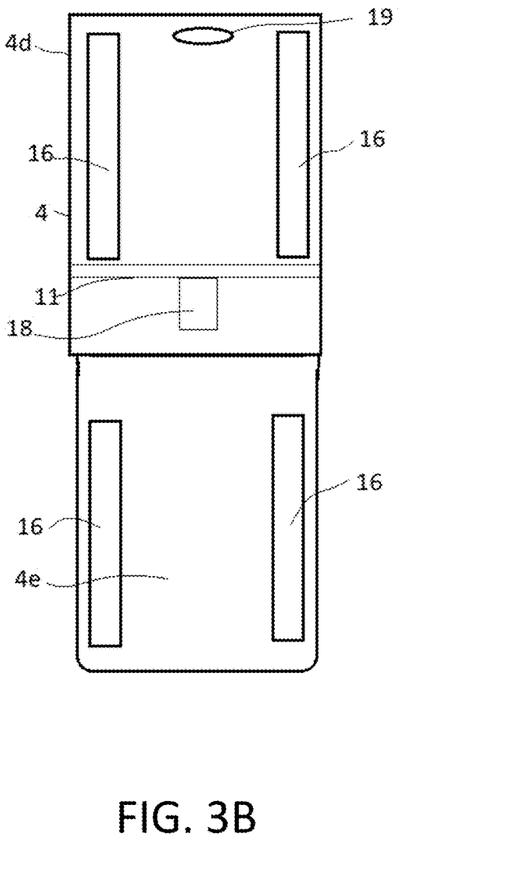

Turning now to FIGS. 3A and 3B, there are shown rear views of an alternate configuration of an identification holder 4. Rather than the front portion 4d folding down to expose the pocket, as shown in FIG. 3, the configuration shown in FIGS. 3A and 3B has the back side 4e folded up and attached to the back of the front portion 4d. The back portion 4d may be held in place by a tearable seam 14, such as a basting stitch which keeps the back portion closed until torn and then provides a visible indicator that the interior has been accessed. Once the back portion 4e has been pulled away from the front portion 4c, a second/inner pocket 11 is exposed and the tab 18 of the vest can be accessed. Hook and loop fasteners (such as VELCRO) can be used to secure the front portion 4d and the rear portion 4e together after the basting stitch has been torn if needed. Also shown in FIG. 3B is a grommet 19 which can facilitate use of a removable lanyard.

It will be appreciated that the part of the front portion 4d which forms the front and back of the pocket as well as the back portion 4e can be formed from a single piece of material (typically a nylon or polyester weave—though other materials can be used). The clear vinyl and edge binding (6 and 7 in FIG. 1) can be attached to the part of the fabric forming the front portion opposite the pocket.

Figure 5:
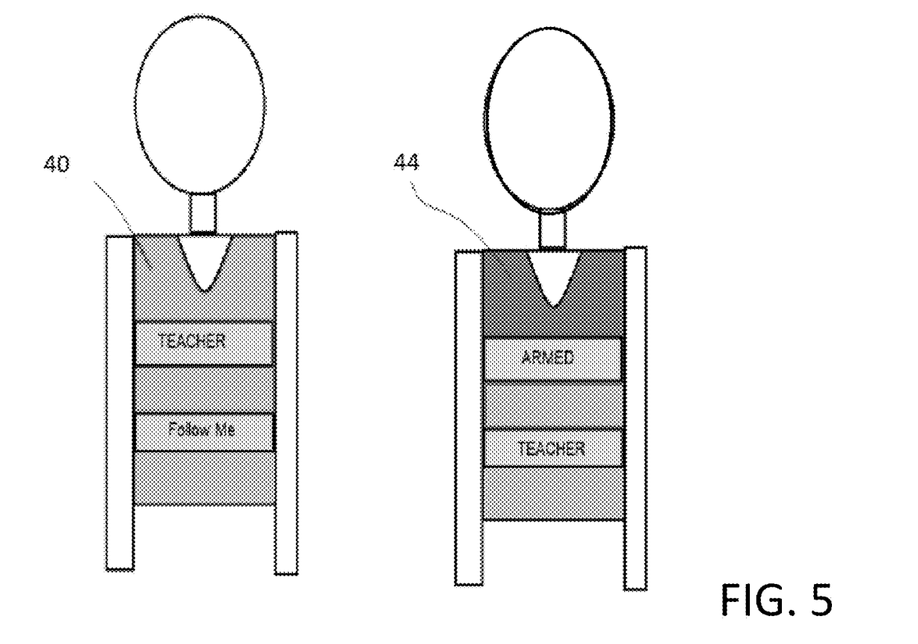
FIG. 5 illustrates two designated authority figures wearing vests made in accordance with principles of the present invention.

Turning now to FIG. 5, there is shown a representation of two people wearing vests. One vest, 40 is provided in a readily identifiable color and may include an identification statement and directions written thereon. Thus, for example, the vest may say "TEACHER" and "FOLLOW ME" in large letters. In a time of panic, the writings on the vest help students or others to identify designated authority figures and to take appropriate action. Other statements on the vest could include, for example, "ADMINISTRATION," "PRINCIPAL" "STAFF," "MAINTENANCE," etc., more specific identifiers may be helpful as they can help first responders to identify appropriate contacts during an emergency. For example, if a school had caught fire or was having a gas leak, a person wearing a vest designated as "MAINTENANCE" may be readily identified by the police or fire department as someone who can help turn off gas supply to the building, or provide needed information about potentially flammable materials which need to be priorities for protection against contact with flame.

The colors of the vest will typically be chosen so as to be readily distinguishable from the colors of the school. Thus, for example a school that's colors are black and red may have vests which are bright orange and bright blue. A school which has colors of blue and orange may utilize vests having florescent green and black. In such a way, students, other adults and first responders can readily identify designated authority figures whom they may follow out of the building or whose instructions they should listen to and will not be confused by similar looking jerseys, school t-shirts, etc.

FIG. 5 also shows a second vest 44 having a related but different color scheme. In many school districts, as well as businesses having special security needs, there may be individuals who are armed but not readily identifiable by police officers. For example, many school districts have proposed and some implemented programs where in certain teachers are given extensive training and provided with concealed weapons to respond to an active shooter situation or terrorist threat. In some districts these teachers include military veterans who have extensive firearms training which may even exceed those of local police officers. Additionally, many of these individuals may have experience in urban combat situations analogous to pursuing an active shooter in a school.

One of the largest concerns of having teachers armed is the risk for mistake in the event that the police have to respond to an active shooter situation. A police officer entering a school to find an adult pointing a weapon at a person who appears to be a student is likely to fire on the adult, even though it may be that the armed adult is a teacher who has cornered a perpetrator and is attempting to hold him or her pending the arrival of police. Vest 44 substantially reduces the risk of a "friendly fire" situation by readily identifying the teacher, administrator, etc. both as being a designated authority figure and as being armed. Thus, the vest 44 includes "ARMED" and "TEACHER" on the vest in clearly identifiable words. Additionally, the vest 44 includes a different color scheme to assist first responders with immediately identifying the wearer as being armed or potentially armed.

In one preferred aspect of the invention the color scheme of the vests is generally unknown. They may be only unknown to the public, or they may even be unknown to faculty and staff of the school or to others in the building. Preferably the police will know or have access to the color scheme prior to arriving at the site of the emergency. Thus, for example, the police may receive a call to respond to an active shooter at North High School and be advised by the principle that designated authority figures will be wearing orange and blue. If the police see someone attempting to act as an authority figure while not wearing a vest, or wearing a vest etc. of a different color, they can pay additional attention to that individual as being a potential perpetrator who is attempting to misdirect people.

The vests 40 and 44 may be made from a very thin material which can be folded up so that they take less than an inch and typically about ½ inch of thickness in the teacher identification holder 4. This allows the identification holder 4 to appear similar to existing identification holders which serve no other purpose or which may include a small pocket for holding other materials. In such a scenario, an outsider might not even be aware that in the event of an emergency all teachers, administration, etc., will be identifiable to students within a few seconds.

Figure 6:
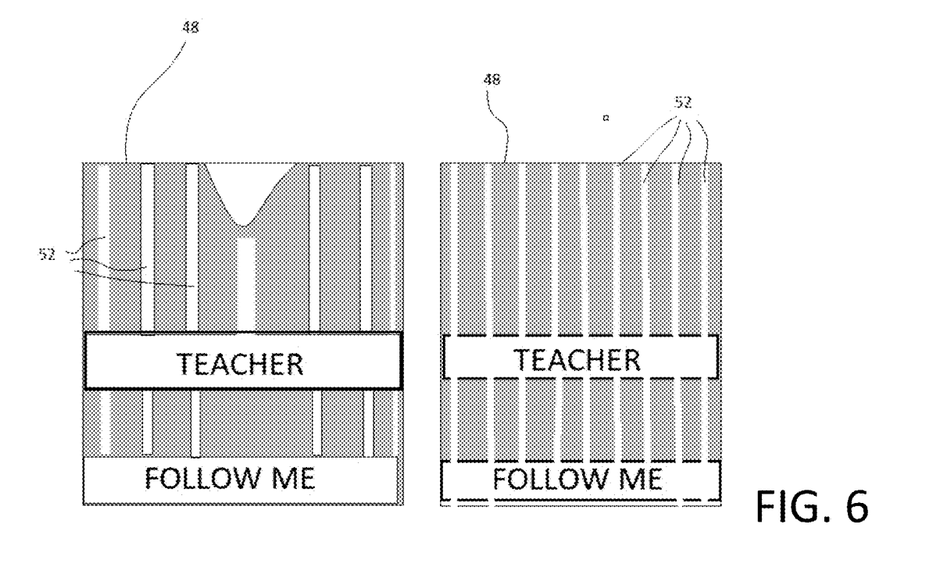
FIG. 6 illustrates alternate embodiments of vests made in accordance with principles of the present invention.

FIG. 6 shows the front and back of a vest 48 which may be made of a material which may include stripes 52 and which will wick blood so as to readily indicate if the person wearing the vest has been shot, stabbed, etc. Examples of materials which provide wicking include various synthetic fabrics, such as polyester blends. If a teacher has been shot attempting to lead students to safety, the visible blood stain would be readily visible and would attract attention of first responders for treatment. If an active shooter shot a teacher and attempted to steal the vest off a teacher that has been shot, the bloodstain would be immediately noticeable and would attract the attention of police.

While the vests 40, 44, 48 may be colored and provide identifying/instructional information on a single side, it will be appreciated that it is generally favorable that both sides of the vest include both identifying/instructional information, and stripes/wicking material to help magnify blood markings on the vest.

Because the vests can be compacted into such a small space and can be carried with identification which teachers and individuals of many businesses are required to carry, the risk that teachers, administrators, or other designated authority figures will be away from their vest during an emergency is substantially reduced. The vests provide an immediate reassurance for children in a school environment, as they immediately know who they should listen to in the event of an emergency. They also substantially improve information flow to first responders who can readily identify the designated authority figures as individuals who both have a right to be there and who are likely sources of valuable information. Such a system can be implemented at a very reasonable price in light of the benefits provided and without providing disruptions to the designated authority figures during their ordinary day-to-day tasks.

Figure 7:
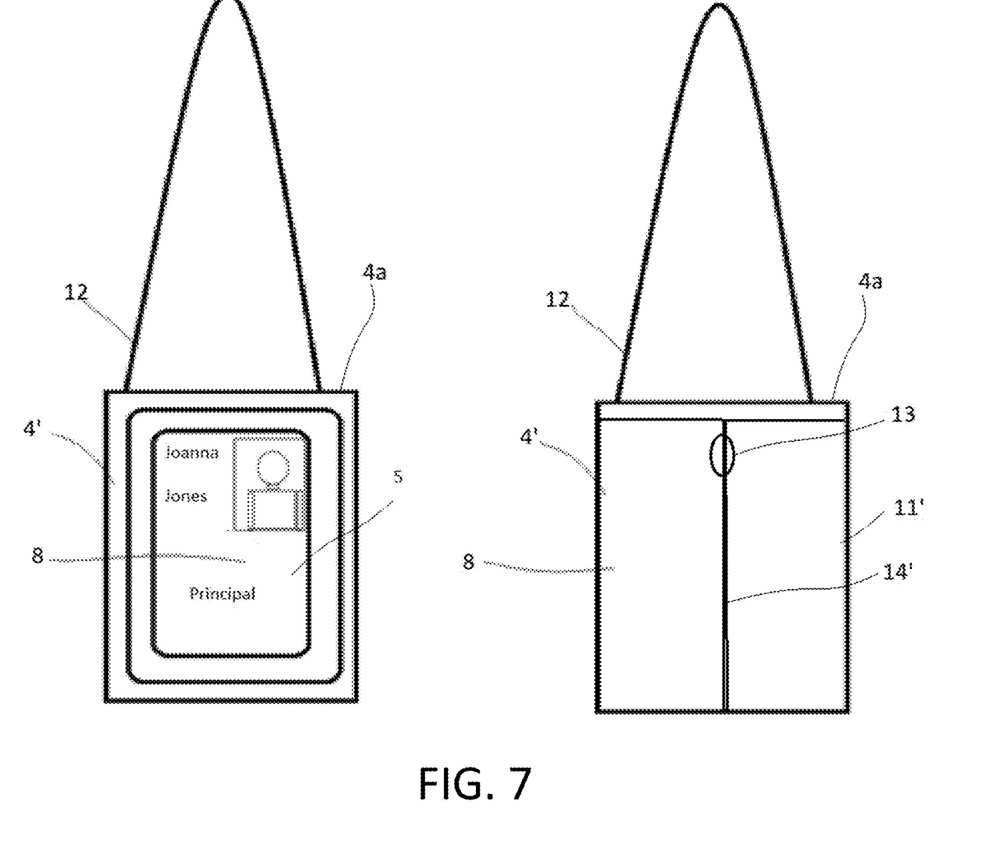
FIG. 7 shows front and back views of an alternate configuration of an emergency identification holder.

Turning now to FIG. 7, there is shown an alternate configuration of an emergency identification system. While the identification holder 4' includes a front pocket 5 for holding identification card eight, the identification holder is not formed so as to have two halves to pivot with respect to one another. Rather, a second pocket 11' is disposed on the backside of the first pocket 5 and includes a tearable seam 14' which is normally closed but which may be opened to provide access to a vest (not shown) disposed in the second pocket. A pull tab 13 may be provided to facilitate tearing of the seam 14' to provide access to the vest disposed within the pocket. While not shown in FIG. 7, utilizing the pull tab 13 to open the tearable seam 14' may activate a chip or other electronics to indicate that the vest has been deployed, thereby indicating an emergency. The pull tab 13 may also be attached to the vest so as to at least partially deploy the vest when pulled to tear the seam 14'.

Figure 8:
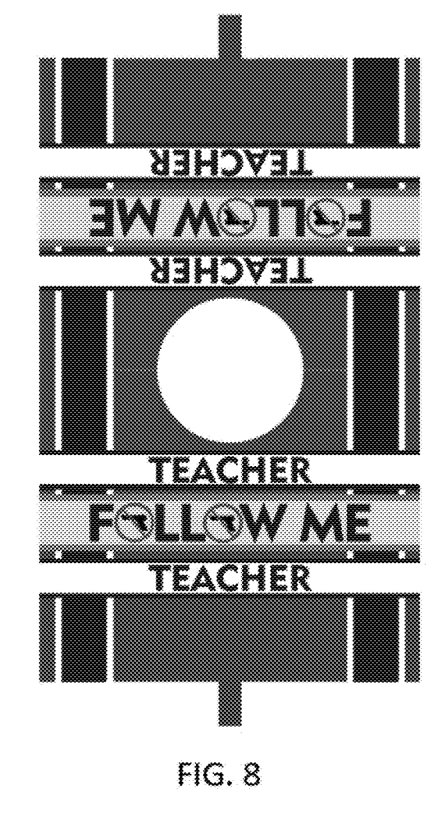
FIGS. 8, 9 and 10 show alternate vest designs as may be used in accordance with the present invention.
Figure 9:
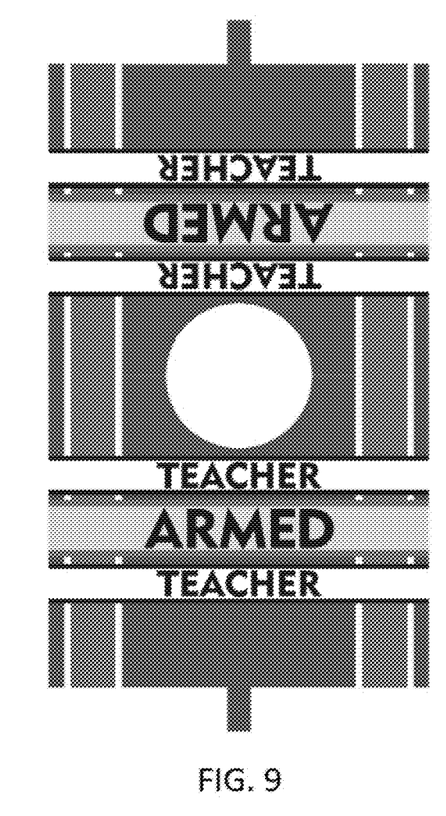
Figure 10:
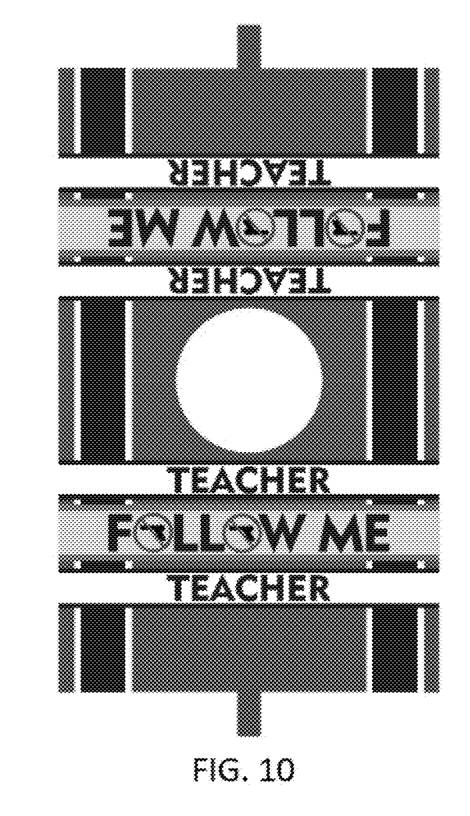

FIGS. 8 through 10 show different variations of vests which could be included in the identification holders. The vests may be different colors and can have different graphics and words printed thereon. Though not required, is it advantageous to have the vests be formed from a very thin piece of material, such as nylon, etc. to facilitate the vest folding down into a very small space. The vests will also typically include a tab at either end to facilitate removal and an opening near the middle so that the vest can be placed over the user's head.

Figure 11:
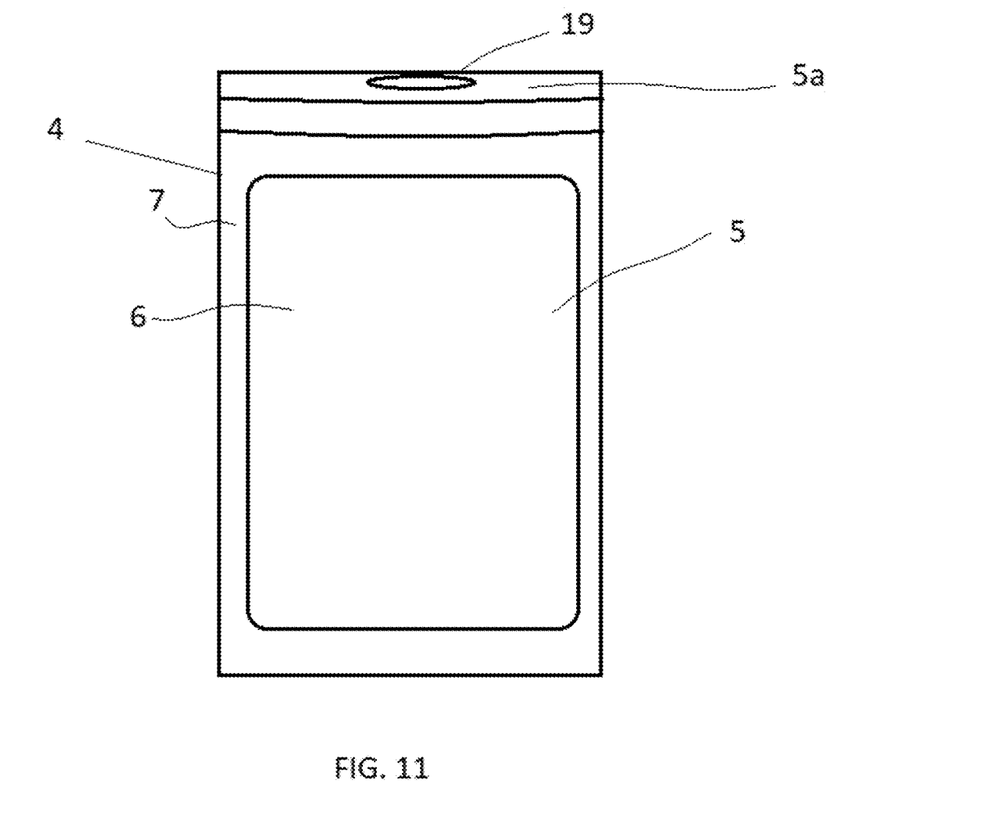
FIG. 11 shows yet another configuration of a personal identification holder.

FIG. 11 shows yet another identification holder 4. The holder 4 includes the pocket 5 for holding identification, and includes a second pocket 5*a* which may be used for other identification (i.e. a driver's license), credit cards, a key, etc. The identification holder may also have a grommet, etc., for attachment to a lanyard and may otherwise be formed in a manner similar to the embodiments discussed above.

Thus, there is disclosed an emergency identification system. It will be appreciated that numerous modifications may be made without departing from the scope and spirit of this disclosure. The appended claims are intended to cover such modifications.

What is claimed is:

1. An emergency identification system comprising:
   a lanyard;
   an identification holder attached to the lanyard, the identification holder having a front portion having a first pocket with a transparent side for holding a piece of identification so that the piece of identification can be seen through the transparent side and a back portion releasably attachable to the front portion;
   a vest having indicia thereon identifying a wearer as an authority figure; and
   a second pocket holding the vest, the second pocket being inaccessible unless the front portion and the rear portion are detached from one another.

2. The emergency identification system of claim 1, wherein the second pocket is formed in the front portion on a side generally opposite the first pocket and wherein the pocket is open at a bottom end thereon to facilitate removal of the vest from the second pocket.

3. The emergency identification system of claim 1, wherein the front portion and the back portion are attached by a tearable seam which provides a visual indication when the front portion and back portion have been pulled apart.

4. The emergency identification system of claim 1, further comprising a chip disposed in the identification holder which is activated when the tearable seam is torn and the identification holder opened.

5. The emergency identification system of claim 4, wherein the chip includes a transmitter.

6. The emergency identification system of claim 5, wherein the system further comprises a plurality of sensors configured to generate a signal indicating that the chip has been activated.

7. The emergency identification system of claim 6, wherein the system is disposed in a school and wherein the school is configured to close doors in response to signals indicating the identification holders have been opened.

8. An emergency identification system comprising:
   an identification holder having a first pocket for holding identification and a second pocket for holding a vest; and
   a vest disposed in the second pocket; and
   wherein the identification holder has a tearable closure for selectively preventing access to the second pocket such that the second pocket is not accessible unless the tearable closure has been torn and wherein the torn closure provides evidence that the second pocket has been accessed.

9. The emergency identification system of claim 8, wherein the emergency identification system includes a plurality of identification holders holding a plurality of vests, at least one of the vests having a first color scheme and at least one of the vests having a second color scheme different from the first color scheme.

10. The emergency identification system of claim 9, wherein the at least one of the vests which has the second color scheme has indicia disposed thereon for indicating that a person wearing the vest is armed.

11. The emergency identification system of claim 8, wherein the vest has a plurality of light-colored stripes formed on the vests for enhancing the visibility of blood on the vest.

12. The emergency identification system of claim 8, wherein the second pocket is closed by a tearable seam extending along the second pocket.

13. The emergency identification system of claim 8, wherein the identification holder has a front portion which folds downwardly when the tearable seam is torn and wherein the vest includes a tab extending out of the second pocket to assist in deploying the vest.

14. A method for identifying designated authority figures during an emergency, the method comprising:
   providing a plurality of identification holders having means for holding the identification holders to people, at least some of the means for holding comprising a lanyard for disposition around a person's neck, each of the identification holders having a pocket with a transparent outer side for receiving and displaying an identification card so that it is visible to the public, and having a vest disposed inside each of the identification holders; and wherein the vests are color coded so as to identify a group of designated authority figures when the vests are worn; and wherein the vests are disposed in pockets in the identification holders which are rendered inaccessible without tearing a seam which has been sewn to inhibit access to the second pocket unless the seam is torn.

15. The method according to claim 14, wherein the method comprises having at least one vest with a visual designation indicating that the wearer of the vest is armed.

16. The method according to claim 14, wherein the vests are disposed in pockets closed by tearable seams so as to provide a visual indication that the vest has been accessed.

17. The method according to claim 14, wherein the identification holder includes a chip for indicating when the identification holder has been opened to provide access to the vest.

18. The method according to claim 17, wherein the chip includes a transmitter.

19. The method according to claim 17, wherein the method comprises disposing a plurality of sensors in a building for detecting signals emitted from the chip.

20. The method according to claim 17, wherein the method is disposed in a school and wherein the vests are provided in a color which are visually distinct from the colors of the school.

21. A method for identifying designated authority figures during an emergency, the method comprising:

providing a plurality of identification holders having means for holding the identification holders to people, each of the identification holders having a pocket for receiving an identification card and having a vest disposed inside each of the identification holders; and wherein the vests are color coded so as to identify a group of designated authority figures when the vests are worn;

wherein the identification holder includes a chip for indicating when the identification holder has been opened to provide access to the vest; and further comprising a system for shutting doors in response to signals detected indicating that the pockets containing the vests have been accessed.

* * * * *